United States Patent [19]

Silveri

[11] Patent Number: 5,389,210
[45] Date of Patent: Feb. 14, 1995

[54] METHOD AND APPARATUS FOR MOUNTING AN ELECTROLYTIC CELL

[76] Inventor: Michael A. Silveri, 702 Martis Peak, Incline Village, Nev. 89451

[21] Appl. No.: 240,532

[22] Filed: May 10, 1994

Related U.S. Application Data

[63] Continuation of Ser. No. 105,365, Aug. 11, 1993, abandoned, which is a continuation of Ser. No. 960,265, Oct. 13, 1992, abandoned, which is a continuation of Ser. No. 759,692, Sep. 6, 1991, abandoned, which is a continuation of Ser. No. 680,591, Mar. 28, 1991, abandoned, which is a continuation of Ser. No. 597,085, Oct. 15, 1990, abandoned, which is a continuation-in-part of Ser. No. 424,305, Aug. 18, 1989, Pat. No. 4,992,156.

[51] Int. Cl.[6] .......................... C25B 9/04; C25B 15/08
[52] U.S. Cl. ........................... 204/1.11; 204/269; 204/273; 204/275; 204/279
[58] Field of Search ....................... 204/267-271, 204/273, 275-279, 237, 242, 1.11; 210/169

[56] References Cited

U.S. PATENT DOCUMENTS

| 844,262 | 2/1907 | Dieterich | 204/275 |
|---|---|---|---|
| 2,864,750 | 12/1958 | Hughes, Jr. et al. | 204/149 |
| 2,887,444 | 5/1959 | Lindstaedt | 204/152 |
| 3,092,566 | 6/1963 | Negus | 204/240 |
| 3,222,269 | 12/1965 | Stanton | 204/275 X |
| 3,222,270 | 12/1965 | Edwards | 204/269 |
| 3,223,242 | 12/1965 | Muray | 210/139 |
| 3,305,472 | 2/1967 | Oldershaw et al. | 204/268 |
| 3,334,035 | 8/1967 | Dews et al. | 204/130 |
| 3,351,542 | 11/1967 | Oldershaw et al. | 204/149 |
| 3,361,663 | 1/1968 | Murray et al. | 204/278 |
| 3,378,479 | 4/1968 | Colvin et al. | 204/248 |
| 3,458,414 | 7/1969 | Crane et al. | 204/149 |
| 3,552,568 | 1/1971 | Wade | 210/169 |
| 3,563,879 | 2/1971 | Richards et al. | 204/272 |
| 3,669,857 | 6/1972 | Kirkham et al. | 204/151 |
| 3,684,460 | 8/1972 | Arneson | 23/267 A |
| 3,736,322 | 5/1973 | Helber et al. | 204/266 |
| 3,752,747 | 8/1973 | Treharne et al. | 204/149 |
| 3,766,045 | 10/1973 | Itakura et al. | 204/275 |
| 3,767,557 | 10/1973 | Lamm | 204/263 |
| 3,793,178 | 2/1974 | Austin et al. | 204/275 X |
| 3,835,018 | 3/1974 | Casanovas et al. | 204/228 |
| 3,835,020 | 9/1974 | Galneder | 204/268 |
| 3,893,902 | 7/1975 | Loftfield et al. | 204/95 |
| 3,945,905 | 3/1976 | Persson | 204/212 |
| 3,957,599 | 5/1976 | Lindsay et al. | 204/105 R |
| 4,085,028 | 4/1978 | McCallum | 204/269 |
| 4,097,356 | 6/1978 | Yates | 204/237 |
| 4,100,052 | 7/1978 | Stillman | 204/268 |
| 4,121,991 | 10/1978 | Miller et al. | 204/260 |
| 4,124,480 | 11/1978 | Stevenson | 204/268 |
| 4,129,493 | 12/1978 | Tighe et al. | 204/228 |
| 4,136,005 | 1/1979 | Persson et al. | 204/266 |
| 4,193,858 | 3/1980 | King | 204/268 |

(List continued on next page.)

FOREIGN PATENT DOCUMENTS

| 206934 | 9/1974 | Argentina . |
| 206935 | 9/1974 | Argentina . |
| 205712 | 5/1976 | Argentina . |
| 43263 | 12/1973 | Australia . |

(List continued on next page.)

OTHER PUBLICATIONS

Halogen Systems Advertisement (Mailer), distributed Sep. 1989.
Halogen Systems Advertisements (Flyer), distributed Nov. 1989.

*Primary Examiner*—Donald R. Valentine
*Attorney, Agent, or Firm*—Knobbe, Martens, Olson & Bear

[57] ABSTRACT

Attaching apparatus which has a cell of electrodes (30) with an aperture (32) in the center, housed in an enclosure (34) containing a matching bore (36). A nipple (46) with a flange (50) on one end and a series of adjacent notches (48) is screwed into a pool adapter (58) retaining the enclosure tightly against the wall of the pool. Edge spacers (44) fill the gap where pools are contoured.

31 Claims, 5 Drawing Sheets

U.S. PATENT DOCUMENTS

| | | | |
|---|---|---|---|
| 4,196,068 | 4/1980 | Scoville | 204/255 |
| 4,200,230 | 4/1980 | Gould | 239/66 |
| 4,201,651 | 5/1980 | Themy | 204/217 |
| 4,202,738 | 5/1980 | Stillman | 204/95 |
| 4,229,272 | 10/1980 | Yates | 204/128 |
| 4,248,690 | 2/1981 | Conkling | 204/268 |
| 4,255,246 | 3/1981 | Davis et al. | 204/228 |
| 4,256,552 | 3/1981 | Sweeney | 204/98 |
| 4,263,114 | 4/1981 | Shindell | 204/149 |
| 4,290,873 | 9/1981 | Weaver | 204/228 |
| 4,334,968 | 6/1982 | Sweeney | 204/96 |
| 4,337,136 | 6/1982 | Dahlgren | 204/242 |
| 4,361,471 | 11/1982 | Kosarek | 204/128 |
| 4,363,713 | 12/1982 | Bindon | 204/278 |
| 4,368,550 | 1/1983 | Stevens | 4/507 |
| 4,411,759 | 10/1983 | Olivier | 204/260 |
| 4,419,207 | 12/1983 | Bindon | 204/237 |
| 4,422,919 | 12/1983 | Fabian et al. | 204/270 |
| 4,472,256 | 9/1984 | Hilbig | 204/266 |
| 4,492,618 | 1/1985 | Eder | 204/152 |
| 4,525,253 | 6/1985 | Hayes et al. | 204/149 |
| 4,555,323 | 11/1985 | Collier | 204/258 |
| 4,565,617 | 1/1986 | Ahuja | 204/229 |
| 4,584,106 | 4/1986 | Held | 210/754 |
| 4,599,159 | 7/1986 | Hilbig | 204/266 |
| 4,613,415 | 9/1986 | Wreath et al. | 204/98 |
| 4,701,265 | 10/1987 | Carlsson et al. | 210/744 |
| 4,714,534 | 12/1987 | Fair et al. | 204/269 |
| 4,719,018 | 1/1988 | Przybylski | 210/169 X |
| 4,767,511 | 8/1988 | Aragon | 204/128 |
| 4,789,448 | 12/1988 | Woodhouse | 204/228 |
| 4,790,923 | 12/1988 | Stillman | 204/268 |
| 4,818,389 | 4/1989 | Tobias et al. | 210/169 |
| 4,861,451 | 8/1989 | David | 204/230 |
| 4,935,980 | 6/1990 | Leginus et al. | 15/1.7 |
| 4,936,979 | 6/1990 | Brown | 204/237 X |
| 4,986,906 | 1/1991 | Dadisman | 210/169 |
| 4,992,156 | 2/1991 | Silveri | 204/228 |
| 4,997,540 | 3/1991 | Howlett | 204/271 |
| 5,013,417 | 5/1991 | Judd, Jr. | 204/228 |
| 5,034,110 | 7/1991 | Glore et al. | 204/228 |
| 5,037,519 | 8/1991 | Wiscombe | 204/237 |
| 5,059,296 | 10/1991 | Sherman | 204/228 |
| 5,094,734 | 3/1992 | Torrado | 204/234 |
| 5,228,964 | 7/1993 | Middleby | 204/275 X |
| 5,254,226 | 10/1993 | Williams et al. | 204/128 |

FOREIGN PATENT DOCUMENTS

| | | | |
|---|---|---|---|
| 126365 | 4/1979 | Australia . | |
| 11632 | 8/1983 | Australia . | |
| 1140060 | 1/1956 | France . | |
| 2080449 | 11/1971 | France . | |
| 2227182 | of 1990 | Japan | 204/242 |
| 8601543 | 3/1986 | WIPO | 204/271 |

METHOD AND APPARATUS FOR MOUNTING AN ELECTROLYTIC CELL

This application is a continuation of application Ser. No. 08/105,365, filed Aug. 11, 1993, now abandoned, is a file wrapper continuation of application Ser. No. 07/960,265, filed Oct. 13, 1992, now abandoned, which is a file wrapper continuation of application Ser. No. 07/759,692, filed Sep. 6, 1991, now abandoned which is a file wrapper continuation of application Ser. No. 07/680,591, filed Mar. 28, 1991, now abandoned which is a file wrapper continuation of application Ser. No. 07/597,085, filed Oct. 15, 1990, now abandoned which is a continuation-in-part of application Ser. No. 07/424,305, filed Aug. 18, 1989, now U.S. Pat. No. 4,992,156, which issued Feb. 12, 1991.

TECHNICAL FIELD

The invention relates to attachment of swimming pool water purifiers in general and more specifically to apparatus fastening a submerged electrolytic cell to a pool equipped with a piped water circulating system.

BACKGROUND ART

The invention is directed to water purifiers that are submerged in a swimming pool attached to existing piping and fittings. Prior art appears to be lacking in this area as most equipment utilizing electrolytic devices to produce a PH neutral sanitizer in the form of sodium hypochlororite, are either integral with the piping in a flow through manner or are designed to float on top of the pool water.

A search of the prior art did not disclose any patents that read directly on the claims of the instant invention however, the following U.S. Pat. Nos. were considered related:

| U.S. PAT. NO. | INVENTOR | ISSUED |
| --- | --- | --- |
| 4,790,923 | Stillman | 13 December 1988 |
| 4,565,517 | Ahuja | 21 January 1986 |
| 4,525,253 | Hayes et al | 25 June 1985 |
| 4,422,919 | Fabian et al | 27 December 1983 |
| 4,419,207 | Bindon | 6 December 1983 |
| 4,363,719 | Bindon | 14 December 1982 |
| 4,255,246 | Davis et al | 10 March 1981 |
| 4,100,052 | Stillman | 11 July 1978 |
| 3,458,414 | Crane et al | 29 July 1969 |

Stillman '923 places an electrolytic cell for producing a halogen biocide and oxygen in a liquid containing salt in a housing that is connected to a swimming pool filtering system external to the pool itself.

Ahuja teaches an apparatus for converting solar energy into stored hydrogen that is immersed in the water or fresh water. The apparatus floats with hydrogen collection tubes that are vertically disposed below the solar cells.

Hayes et al on the other hand employs a purification cell, in line with a pump and filter using conventional piping in a watertight neighboring compartment adjacent to the swimming pool.

Fabian et al discloses a compact electrolytic cell in direct through-flow piping with liquid entering an in-line tubular shaped housing and an outgasing container through an entrance tube. The gas outflows from the chamber and the liquid drains from another line.

Bindon '207 submerges his halogen generator in water with the anode and cathode being separated by a bed of salt. The chlorine is then collected by a hood. The only external connection is a cable for electrical power and a tube leading from a point below the anode to above the cell allowing liquid to enter when a bubble of gas is vented.

Bindon '719 is the parent patent for the above '207 and functions in the same manner except the tube is lacking.

Davis et al employs a closed loop piping system that uses wire wound electrodes within a separate housing. This chloronator is coupled in the pump line of a swimming pool system all external to the pool generally above ground.

Stillman in '052 installs an electrolytic cell in the piping of a fluid system to generate halogen directly from a solution containing a very low salt concentration allowing placement in existing as well as new facilities. The cell includes planar electrode plates attached parallel across the entire cross sectional area of an enclosure. The cell operation requires constant flow of fluid to prevent the buildup of hydrogen gas.

Crane et al teaches a system including a electrolytic cell and a chemical injector for cleaning the cell and a control system for shut-down in the event of improper operating conditions. The integrated system is piped away from the swimming pool using only the suction line and return line interfacing with the pool.

It may be clearly seen that prior art employing an electrolytic cell is concerned with its basic function and structure and little concern is given to the attaching structure itself particularly to a cell that is totally immersed in the swimming pool itself.

DISCLOSURE OF THE INVENTION

The electrolytic cell attaching apparatus provides superior descaling under adverse conditions. An apparatus was constructed according to this design and was operated for one year on a swimming pool with over 2000 PPM total hardness and was never descaled. These results are even more impressive when the other scaling factors are considered. The pH was as high as 8.2 at times and alkalinity was consistently above 190 ppm. According to the Langlier Index, this pool had a factor of over +2. The +0.5 to −0.5 range is generally regarded as in "balance". There were at times visible piles of scale on the bottom of the pool which were easily removed by vacuuming or scooping with a skimmer net. Some scale did build up on the inlet nipple on which the cell is mounted to the wall of the pool but this was easily cleaned. As a comparison, a state-of-the-art unit, commercially known as Lectranator, was run under conditions of approximately 500 total hardness for less than two-hundred hours and developed scale on the leading edges of the electrodes which necessitated descaling. In fact,their instruction manual recommends only using this unit below a calcium hardness of 350 ppm. Calcium hardness is usually about 70 percent of total hardness. The apparatus also provides a superior attachment design. The attachment of a electrolytic cell purifier to a pool may appear to be a minor procedure. However, if the swimming pool itself must be modified or at least constructed differently in order to use this type of pool purifier it becomes a major drawback to its use. Repiping or modifying any structure in a pool is difficult and expensive and the integrity of the watertight seal is always in jeopardy. The inventors previous application, Ser. No. 07/424,305 now U.S. Pat. No.

4,992,156 having a filing date of Mar. 18, 1989 discloses an electrolytic cell for total submersion in the swimming pool Its unique features include a method of supplying electrical power to the cell through the use of a wire that is pulled through the existing piping and exits through a newly drilled hole. The wire is sealed at the interface of the pipe with a compression fitting that clamps both the wires and the pipe with a resilient disc. The problem remaining is that the cell is located near the discharge pipe with the wire unsupported therebetween and the cell must be separately attached to the pool wall.

While the system functions properly, an improvement has been made that combines the attachment and covers the unsupported wires completely. Further if the pool is piped for a pool sweeping apparatus an internally threaded fitting is already available at the interface with the pool. Additionally, the threaded fittings for a return line may also be used. It is therefore a primary object of the invention to employ the existing piping of the pool for the attachment of the purifier minimizing and greatly simplifying the installation process. A physical replacement of the directional nozzle with an interchangeable nozzle containing a wire passage is required with the existing pool sweeping arrangement or it may be preferred to add this feature when the pool is built for ease of installation later. A second method of attaching is employing an adapter plate with a seal on one side and a threaded hole in the middle. The plate itself is attached to the pool wall or to a cover plate fitting over the discharge opening with the plate containing a slot that allows the wire to exit the water discharge conduit.

An important object of the invention allows the cell to fit flat against the wall of the pool. This positioning is particularly important because it precludes the possibility that an automatic pool sweeper may get behind the inventive apparatus and impede its progress. Additionally, a flat mounting lessens the probability of a swimmer hitting the purifier and being injured. Further, the size of the purifier cell with the enclosure is small enough to be inconspicuous and not detract from the appearance of the pool, particularly with no wires visible from the outside.

Another object of the invention is directed to accessories in the form of vee shaped edge spacers that attach to the back of the purifier enclosure and fill in the space where the installation is in an area of the pool where the sides are not flat. Any combination of spacers may be used on the sides, top and bottom to add to the safety and maintaining a consistent apparatus of the purifier.

Still another object of the invention relates to the use of water flow directly through the cell. As the enclosed cell is positioned directly in front of the discharge line from the pump, the recirculated water impinges directly on the cells forcing the gases and aligodynamic ions into the pool and reducing buildup of scale. Although this object is advantageous, the system by itself functions properly when the pump is not in operation as the entire cell is submerged the chlorine is dispensed within the pool due to the natural flow path created by the bubbles of gas seeking the surface. Further, the scale is loosened by reversing the polarity of the electrical power to the electrodes.

Yet another object of the invention is the use of a thermoplastic material for the enclosure and attaching accessories which is both electrically non-conductive and by its very nature non-corrosive. Most pool piping today uses plastic as the normal conduit for the water circuit therefore, the purifier is also compatible with the material most frequently employed.

A further object of the invention is the use of a spiral insert placed inside the adapter mounting the purifier that increases the velocity and helping to remove scale from the inside of the pipe near the electrode cell.

These and other objects and advantages of the present invention will become apparent from the subsequent detailed description of the preferred embodiment and the claims taken in conjunction with the accompanying drawings.

BEST MODE FOR CARRYING OUT THE INVENTION

Figure 1:
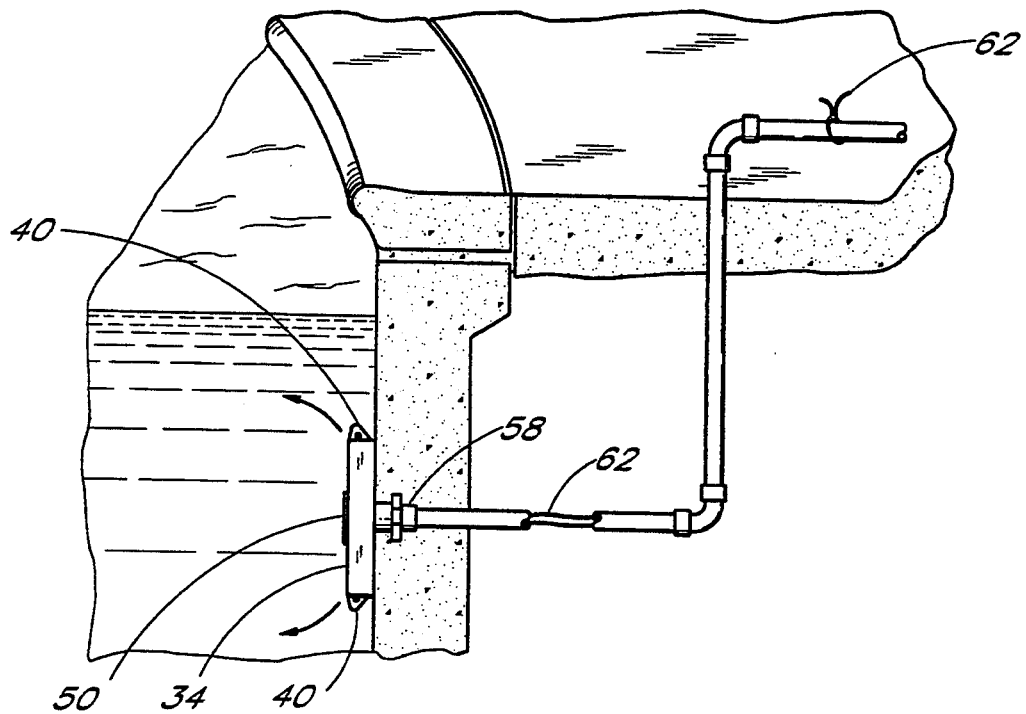
FIG. 1 is a pictorial schematic of the attaching apparatus illustrating the pool and decking in cross section and the purifier in partial cutaway view, arrows depict water flow direction.
Figure 2:
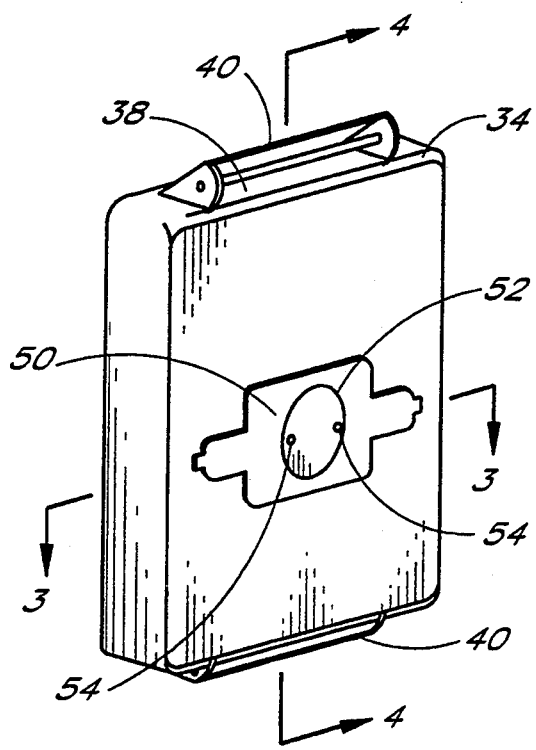
FIG. 2 is a partial isometric view of the preferred embodiment shown from the front.

The best mode for carrying out the invention is presented in terms of a preferred and a second embodiment. Both embodiments are primarily designed alike except for the adapter that interface with the existing pool piping.

The preferred embodiment, as shown in FIG. 1 through 19 and 27 is comprised of an electrolytic cell 30 with a circular aperture 32 in the center. This cell 30 is basically the same as disclosed in the inventors application, Ser. No. 07/424,305, now U.S. Pat. No. 4,992,156, issued Feb. 12, 1991, having a filing date of Mar. 18, 1989 except for the aperture 32 which does not effect the function however, it is unique in that the attachment is made through this opening and recirculated water flows through the cell when the pump is turned on.

The cell 30 is housed in an enclosure 34 that completely encompasses the cell and it likewise contains a bore 36 in direct alignment with the cell aperture 32 allowing full penetration through both elements simultaneously. The housing further contains opening 38 in the top and bottom for the pressurized water to exit when the pool pump is in operation. The openings 38 in both the top and bottom have directional diffusers 40 that guide the water flow away from the edge of the pool.

Figure 3:
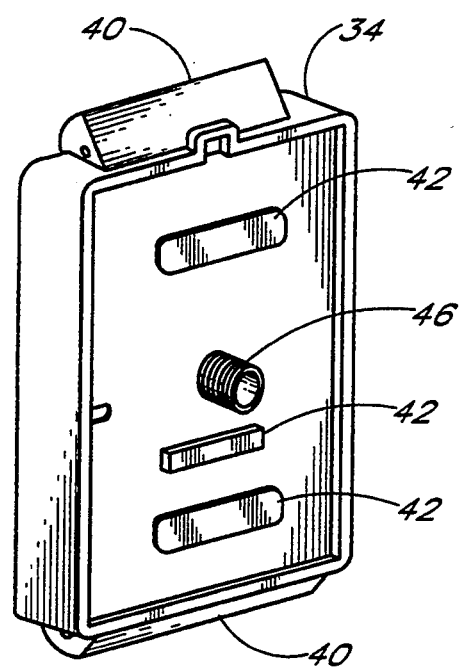
FIG. 3 is a partial isometric view of the preferred embodiment shown from the back.
Figure 4:
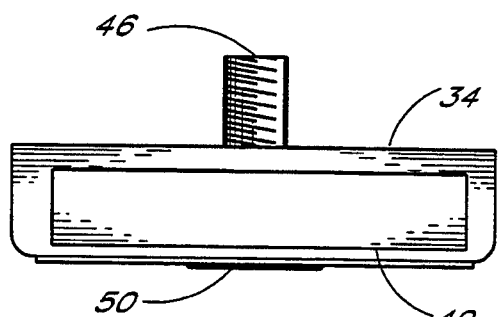
FIG. 4 is a top plan view of the enclosure with attaching nipple installed.
Figure 5:
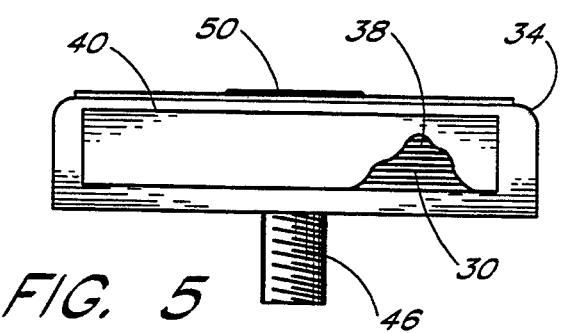
FIG. 5 is a bottom plan view of the enclosure with attaching nipple installed.
Figure 26:
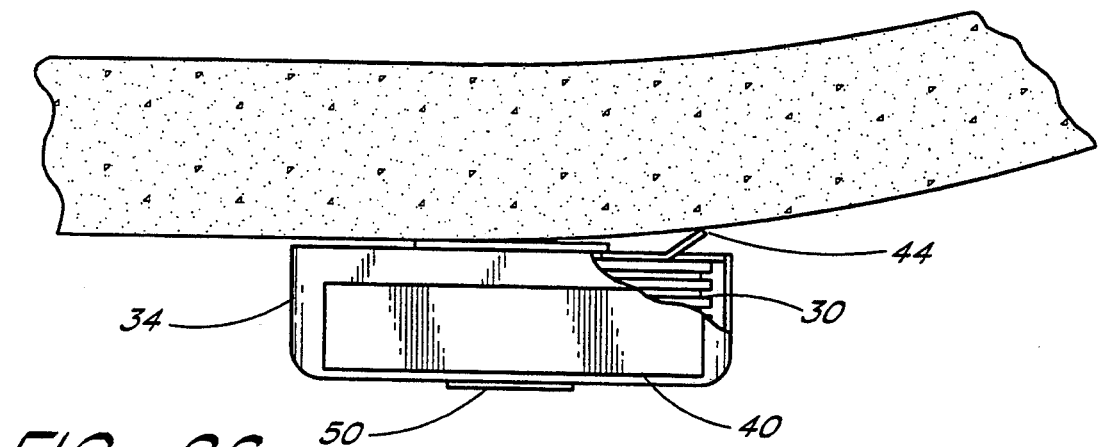
FIG. 26 is a plan view of the enclosure mounted onto a curved pool surface.
Figure 27:
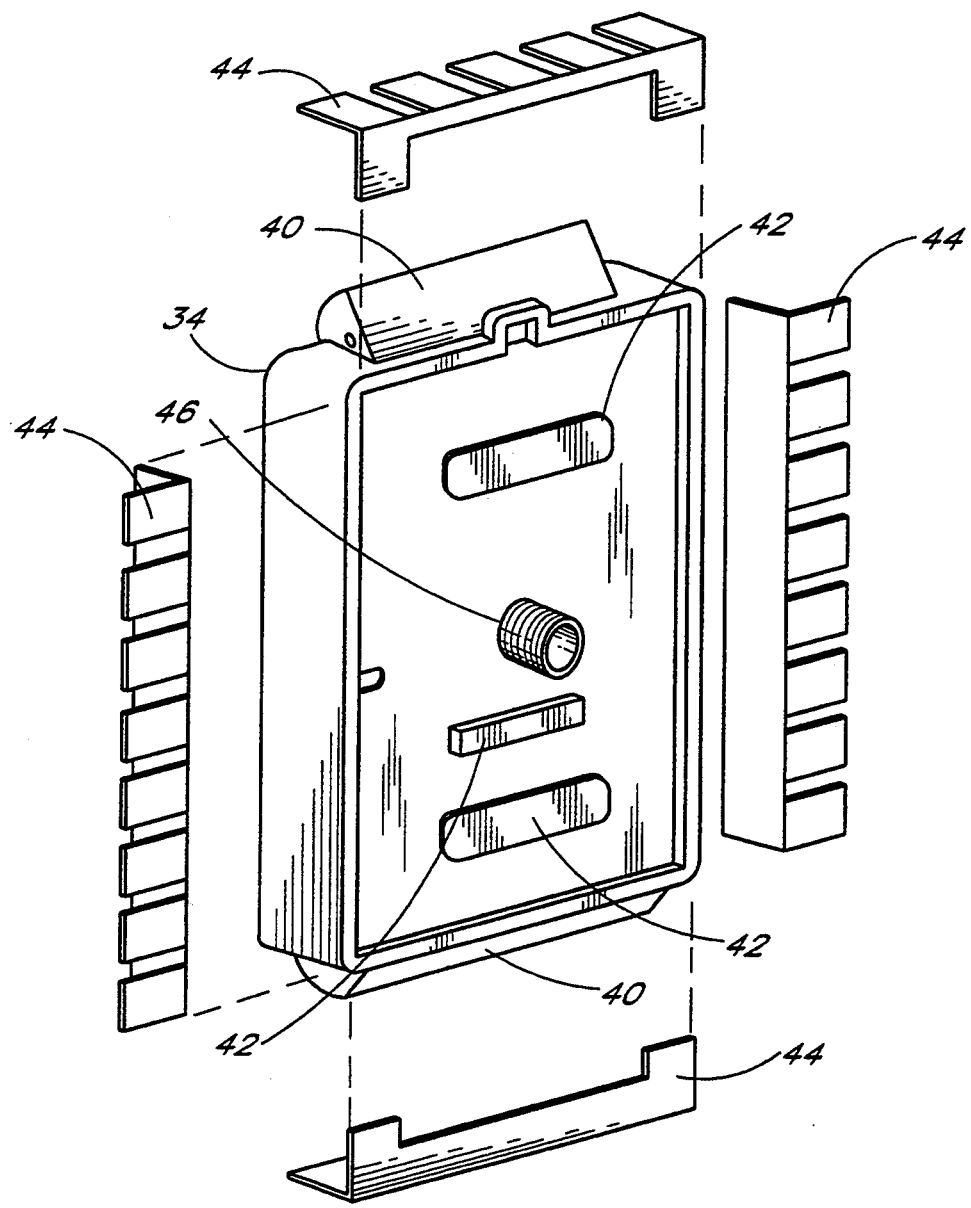
FIG. 27 is a partial isometric view of the invention with four flanged brackets shown separated from the attaching surfaces at the rear.

The enclosure 34 also contains one or more, preferably two, flanged brackets 42 integrally mounted on the back as shown in FIG. 3. These brackets 42 allow edge spacers 44 to be wedged between the enclosure 34 and the side of the pool when the pool inner surface is contoured or otherwise not flat. FIGS. 26 and 27 illustrate this arrangement with four spacers 44 furnished, the proper combination or all of the spacers may be used according to the shape and contour of the pool. The spacers 40 may also be altered, if required for an exact fit. The spacers 44 also take up the difference between the enclosure and pool wall when the attachment is not parallel to the side wall.

A threaded nipple 46 is used for attachment to the pool. Since most pools already have water piping in a conventional recirculating system, usually in conjunction with a filter and heater, the invention employs the fitting already at hand eliminating the necessity of costly installation procedures for attachment of the purifier.

The nipple 46 contains a number of notches 48 in one end, preferably four, allowing system pressurized water to flow inside the hollow nipple and be dispersed through the notches. On the same end as the notches 48 a solid flange 50 is permanently attached. The flange 50 is larger in diameter than the aperture 32 in the cell and also the bore 36 in the enclosure 30 and the enclosure contains a recess 52 the same basic size allowing the flange 50 to fit flush with the outside surface of the enclosure when the nipple penetrates the bore 36. In order to rotate the nipple 46 during assembly and to allow the flange 50 to fit flush in the recess, the outside face of the flange 50 contains two or more cavities 54 that may be matched with a special tool having mating pins positioned in line with the cavities 54.

Figure 9:
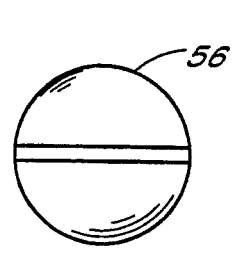
FIG. 9 is a plan view of the spiral insert completely removed from the invention for clarity.
Figure 10:
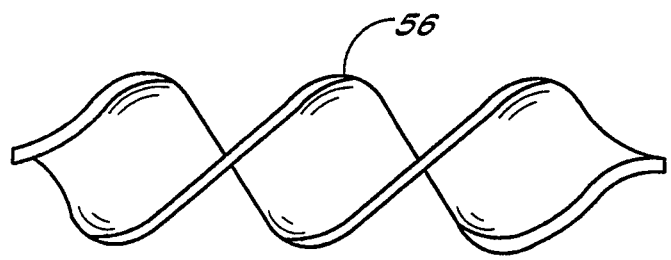
FIG. 10 is a side elevation view of the spiral insert completely removed from the invention for clarity.

In order to prevent scale from accumulating inside the piping adjacent to the purifier a spiral insert 56, shown in FIGS. 9 and 10, is positioned inside the nipple 46 increasing the velocity of the water and dispersing it through the notches 48 in a spiral direction. This device is not mandatory for the invention but acts to improve the durability and longevity of the system as scale may be removed from the pipe when the pump is in operation and augments the reverse polarity cleaning of the power to the cell.

Figure 11:
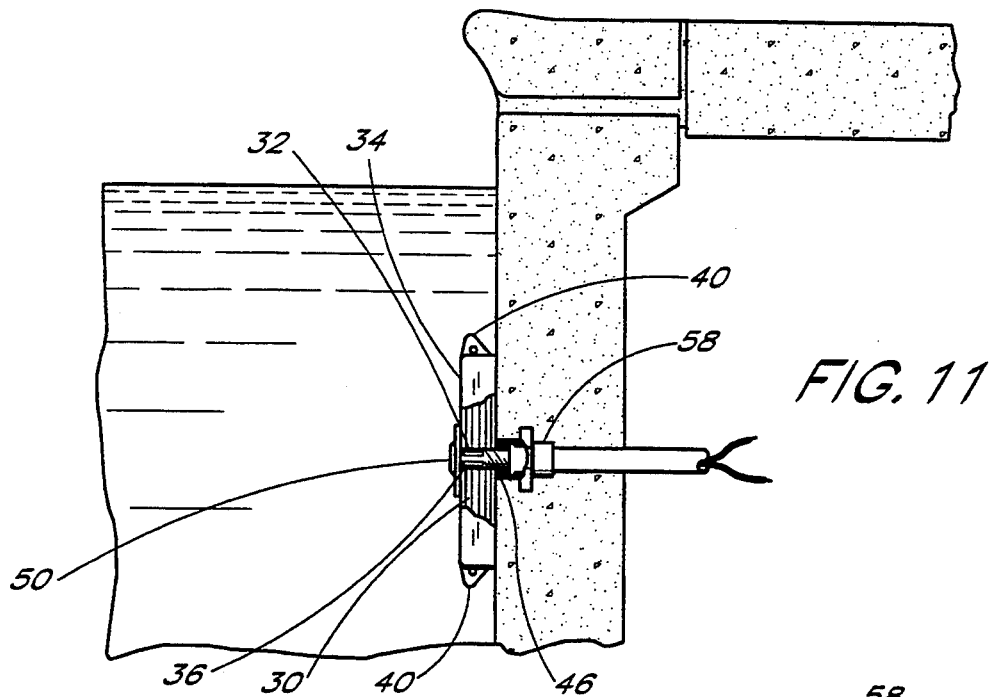
FIG. 11 is a cross section of a pool including the preferred embodiment of installation where a pool sweeper fitting is employed for connection.
Figure 12:
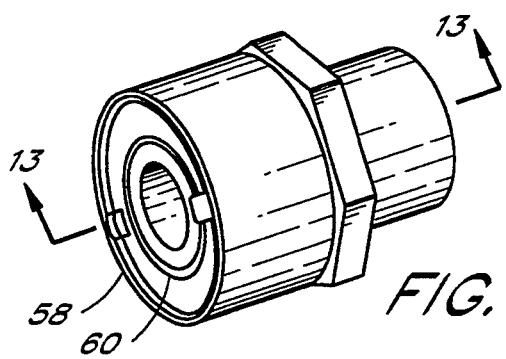
FIG. 12 is a partial isometric view of a unmodified pool sweeper well nozzle shown separately for clarity.
Figure 16:
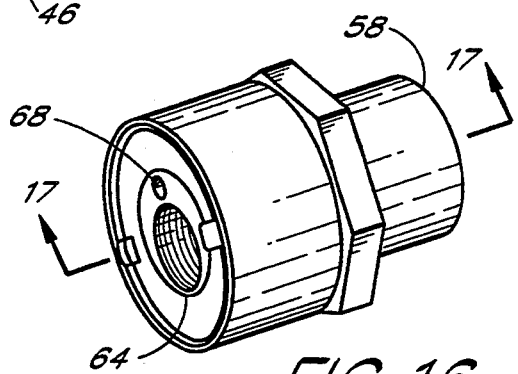
FIG. 16 is a partial isometric view of a substitute pool sweeper well nozzle shown separately for clarity.
Figure 13:
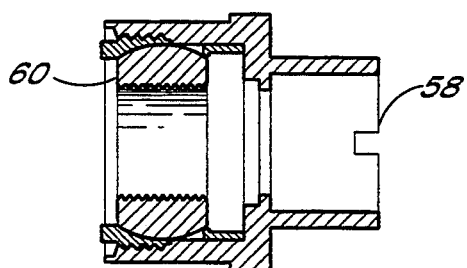
FIG. 13 is a cross-sectional view taken along lines 13—13 of FIG. 12.
Figure 17:
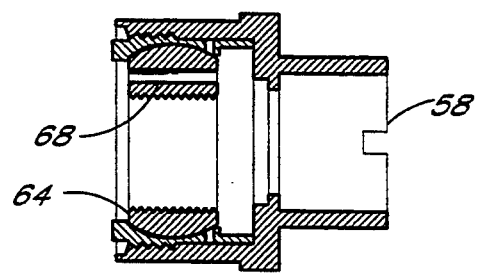
FIG. 17 is a cross-sectional view taken along lines 17—17 of FIG. 16.
Figure 14:
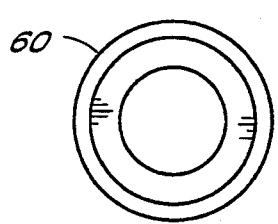
FIG. 14 is a front view of an unmodified pool sweeper well fitting directional nozzle.
Figure 15:
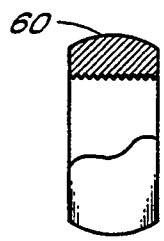
FIG. 15 is a side view of an unmodified pool sweeper well fitting directional nozzle.
Figure 18:
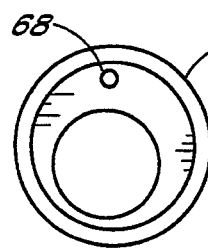
FIG. 18 is a front view of a substitute pool sweeper well fitting directional nozzle.
Figure 19:
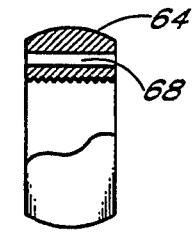
FIG. 19 is a side view of a substitute pool sweeper well fitting directional nozzle.
Figure 20:
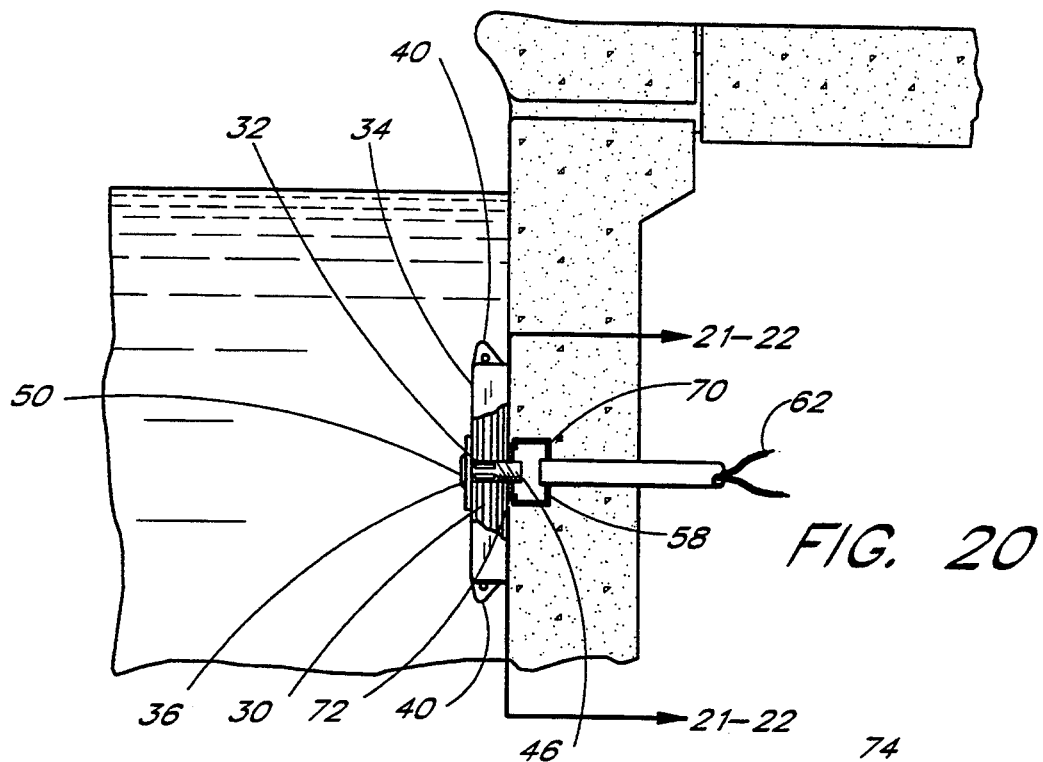
FIG. 20 is a cross-section of a pool illustrating a second embodiment of installation where a discharge wall fitting with cover is employed for connection.

The preferred embodiment of the attaching apparatus utilizes a pool piping adapter 58 shown in FIG. 11 that is basically used for attaching pool sweeping equipment. This type of adapter 58 normally contains an eyeball shaped discharge directional nozzle 60 having internal pipe threads for attachment to the sweeping equipment. The adapter 58 is installed at the end of the discharge line of pool piping beneath the water line of the pool. FIG. 13 illustrates this unmodified nozzle 60 in cross section and by itself in FIGS. 14 and 15. This fitting makes an ideal connecting point for the apparatus however, there is no way to feed the wires 62 needed to operate the purifier through the inside. The preferred embodiment of the invention therefore replaces this nozzle 60 with a substitute nozzle 64 having a threaded offset hole 66 and a wire passageway 68 as shown in FIGS. 16–19. The substitute nozzle 64 is completely interchangeable and is held in place by an existing retaining sleeve permitting the nozzle 64 to be rotatably aligned in the socket of the adapter 58. The wire passageway 68 is outside of the threaded hole 66 permitting the wires 62 to pass freely from the inside of the pipe and be routed easily inside the enclosure for connection to the electrolytic cells 30.

Installation of the attaching apparatus consists of replacing the substitute nozzle 64 in the pool adapter 58 bringing the wires through the passageway 68 and attaching the wires to the electrolytic cell housed in the enclosure 34. The enclosure is then placed on the wall of the pool directly over the adapter 58 and the threaded hollow nipple 46, complete with flange 50 and spiral inset 56, is inserted into the bore 36 through the aperture in the cell 30 and threaded into the offset hole 66 of the nozzle 64 with a tool that is inserted into the cavity 54 in the flange 50. The nipple 46 is tightened securely however,if the pool wall is cured, an appropriate edge spacer 49 is placed against the flanged brackets 42 prior to tightening. It will be noted that if necessary, the edge spacer or spacers 44 may be trimmed or contoured to fit.

Figures 21, 22:
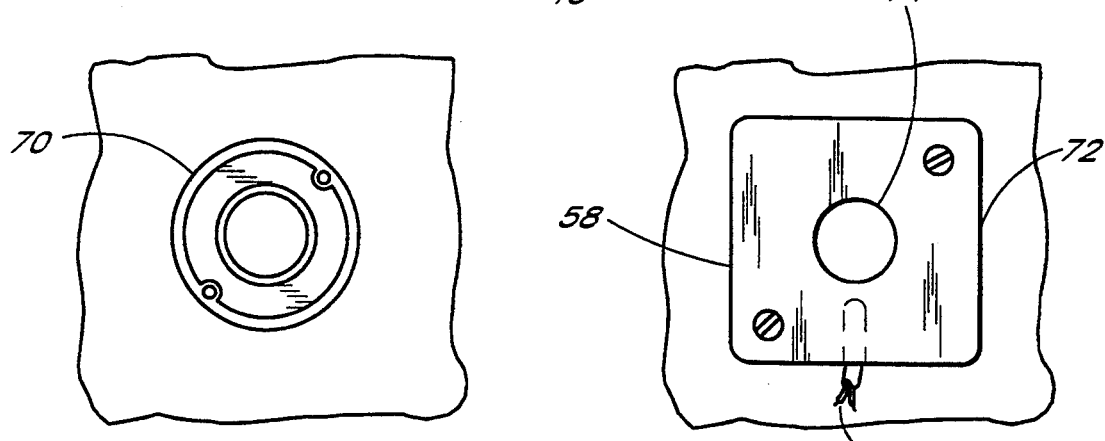
FIG. 21 is a cross-sectional view taken along lines 21—21 of FIG. 20 illustrating the wall fitting with the cover removed.
FIG. 22 is a cross-sectional view taken along lines 22—22 of FIG. 20 illustrating the attaching plate of the invention in the second embodiment attached to the wall fitting.
Figure 23:
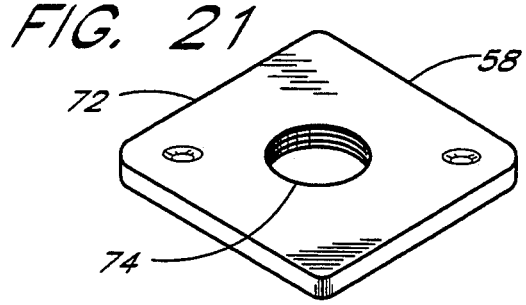
FIG. 23 is a front partial isometric view of the wall plate shown removed from the invention for clarity.
Figure 24:
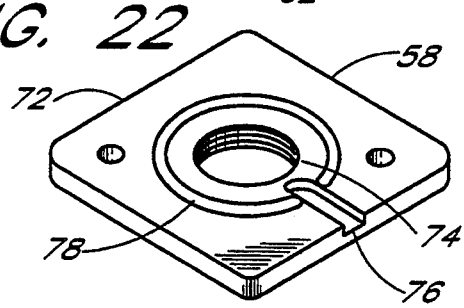
FIG. 24 is a rear partial isometric view of the wall plate shown removed from the invention for clarity.
Figure 25:
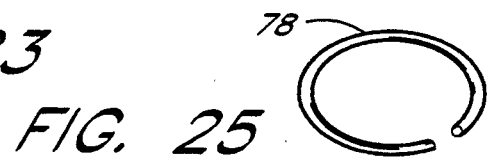
FIG. 25 is a front partial isometric view of the O-ring plate shown removed from the invention for clarity.

The second embodiment illustrated in FIGS. 20–25 employs the same elements as the preferred embodiment except for the pool piping adapter 58. Instead of the pool sweeping type, the adapter is the end of an open pipe surrounded by a wall fitting 70 shown in FIGS. 20 and 21. If the wall fitting contains a grill or diffuser it is removed and not used and in its place, a plate 72 is attached either directly to the wall or the fitting itself as depicted in FIGS. 21 and 22. FIG. 21 illustrates the fitting 70 with the cover removed and FIG. 22 with the plate 72 in place.

The plate 72 itself is preferably constructed of thermoplastic and contains a threaded centrally located hole 74 and an offset wire receiving slot 76 near the hole. An O-ring 78 mounted into a groove partially encircles the hole 74 terminating at the slot 76 permitting the wires 62 to leave the wall fitting 70 and enter the purifier.

The installation is the same as previously described except for the plate 74 which is securely fastened to the pool wall. The nipple 46 is threaded into the hole 74 and the entire purifier is compressibly retained therebetween with the O-ring 78 maintaining a compacting seal.

The invention also discloses a method of using a water circulating pipe as a conduit for a cable for energizing the electrolytic cell. This is unconventional since a water pipe has sharp 90 degree bends contrasted with an electrical conduit which has long radius sweeping 90 degree bends to facilitate pulling of the wire through the conduit. This novel approach was successful because of the specialized reel assembly and the construction of the wire cable.

Figure 6:
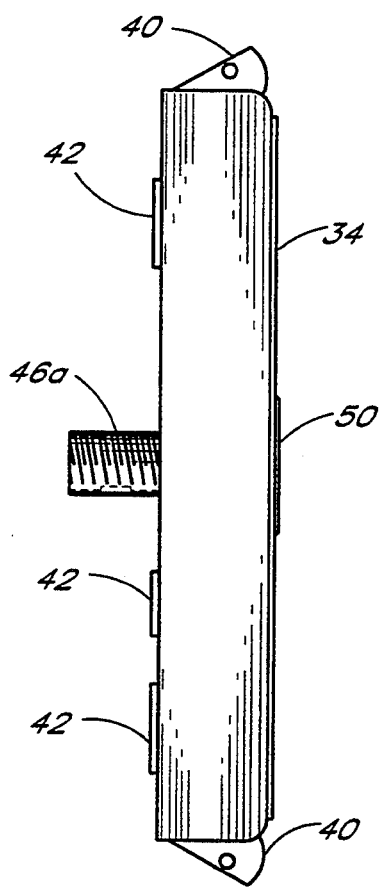
FIG. 6 is a side view of the enclosure with attaching nipple installed.
Figure 7:
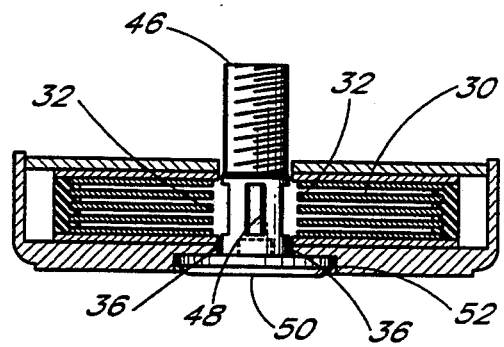
FIG. 7 is a cross-sectional view taken along lines 7—7 of FIG. 2.
Figure 8:
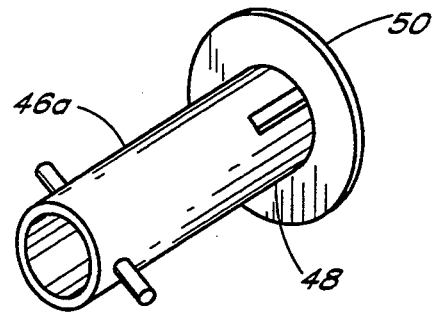
FIG. 8 is a partial isometric view of the attaching nipple completely removed from the invention for clarity.

While the invention has been described in complete detail and pictorially shown in the accompanying drawings it is not to be limited to such details, since many changes and modifications may be made in the invention without departing from the spirit and the scope thereof. For example, a pin and slot connector 46a, as shown in FIGS. 6 and 8 may be used in lieu of the preferred threaded fasteners. Hence, it is described to cover any and all modifications and forms which may come within the language and scope of the claims.

I claim:

1. An apparatus for mounting an electrolytic cell in a swimming pool of the type having a water circulation system, including a pipe in flow communication with the pool beneath the level of water therein, said apparatus comprising:
   an electrolytic cell having a plurality of electrodes;
   an enclosure forming a housing having an internal cavity, said electrolytic cell being disposed within said cavity;
   coupling means for attaching said housing in a position within said pool where a portion of said housing overlies an outlet of said pipe to enable water from said pipe to flow into said cavity; and
   an elongated electrical wire connected to said electrodes of said cell and extending from said cavity through said pipe to connect said cell with a power source emote from said water within said pool.

2. The apparatus as defined in claim 1, wherein said housing further includes an outlet opening whereby water which flows into said cavity from said pipe can discharge therefrom into the water within said pool.

3. The apparatus as defined in claim 2, wherein said coupling means includes a first member positioned at least partially within said pipe and a second member engageable with both said first member and said housing, whereby, when said first and second members are engaged, said housing is maintained in said position within said pool.

4. The apparatus as defined in claim 3, wherein said first member of said coupling means has a passageway therein through which said electrical wire extends.

5. The apparatus as defined in claim 3, wherein said first and second members of said coupling means have complimentary screw threads which enable such members to be engaged with one another.

6. The apparatus as defined in claim 5, wherein said second member of said coupling means includes an elongated body portion coaxially aligned with said pipe and a seat portion engageable against said housing.

7. The apparatus as defined in claim 6, wherein said electrodes have a central bore extending therethrough coaxially with said pipe and wherein said elongated body portion of said second member extends through said bore.

8. The apparatus as defined in claim 7, wherein said elongated body portion of said second member has a flow passage extending at least partially therethrough whereby water flow from said pipe passes therethrough as the water travels to said cavity.

9. The apparatus as defined in claim 8, wherein said flow passage includes an axial passage extending axially through said elongated body portion and at least one radial passage extending radially of said elongated body portion.

10. The apparatus as defined in claim 8, further including an insert member disposed within said flow passage, said insert member being configured to impart a rotational movement to the water flow from said pipe.

11. The apparatus as defined in claim 3, wherein said housing portion overlying said pipe outlet includes an aperture therein.

12. The apparatus as defined in claim 11, wherein said second member of said coupling means includes an elongated body portion extending at least partially through said aperture.

13. The apparatus as defined in claim 12, wherein said elongated body portion is releasably engageable with a portion of said first member of said coupling means.

14. The apparatus as defined in claim 13, wherein said second member of said coupling means further includes a head portion engageable against said housing.

15. The apparatus as defined in claim 14, wherein said elongated body portion and said portion of said first member of said coupling means have complementary screw threads.

16. The apparatus as defined in claim 15, wherein said elongated body portion has a flow passage extending at least partially therethrough, whereby water flow from said pipe passes therethrough as the water travels to said cavity.

17. The apparatus as defined in claim 16, wherein said electrodes have a bore extending therethrough coaxially with said pipe and wherein said elongated body portion of said second member extends through said bore.

18. The apparatus as defined in claim 17, wherein said flow passage includes an axial passage extending axially of said elongated body portion and at least one radial passage extending radially of said elongated body portion.

19. The apparatus as defined in claim 18, further including an insert member disposed within said flow passage, said insert member being configured to impart a rotational movement to the water flow from said pipe.

20. An apparatus for mounting an electrolytic cell in a swimming pool of the type having a water circulation system, including a pipe in flow communication with the pool beneath the level of water therein, said apparatus comprising:
   an electrolytic cell having a plurality of electrodes, said electrodes being planar in configuration and being juxtaposed to one another in generally parallel relationship;
   an enclosure forming a housing for said electrolytic cell, said housing having a first portion disposed directly adjacent to a wall of said pool at a location where the pipe has its outlet end, said housing also having a second portion spaced at least partially away from said first portion to thereby form a cavity between said portions, and said electrodes being disposed within said cavity;

said housing further including mounting means within said cavity for holding said electrodes in position therein;

a coupler having a first member positioned at least partially within said pipe adjacent its outlet end and a second member engageable with both said first member and a portion of said housing, whereby, when said first and second members are engaged, said housing and thus said cell are maintained within said fist portion of said housing at said location;

said electrodes having a central bore therethrough and said first surface of said housing having an aperture therein, said bore and said aperture both being coaxially aligned with said pipe to enable water flow from said pipe to pass through said aperture and said bore, into said cavity and across the surface of said electrodes there within;

said second portion of said housing having at least one opening therein to permit water flow which enters said cavity from said pipe to discharge into the water in said pool; and an elongated electrical wire connected to said electrodes of said cell and extending through said aperture into and at least partially through said pipe to enable said cell to be connected to a power source remote from the water within said pool.

21. The apparatus as defined in claim 20, wherein said first member of said coupler has a passageway through which said electrical wire extends.

22. The apparatus as defined in claim 21, wherein said first and second members of said coupler have complementary screw threads which enable such members to be engaged with one another.

23. The apparatus as defined in claim 22, wherein said second member of said coupler includes an elongated body portion extending through said bore and said aperture, and includes a head portion engaged against said second member of said housing.

24. The apparatus as defined in claim 23, wherein said elongated body portion of said second member has a flow passage extending at least partially therethrough and wherein said water flow from said pipe flows through said flow passage.

25. The apparatus as defined in claim 24, wherein said flow passage includes an axial passage extending axially through said elongated body portion and a plurality of secondary radial passages extending radially of said elongated body portion, whereby water flow from said pipe travels through said axial passage then through said secondary radial passages and across the electrodes in said cavity.

26. The apparatus as defined in claim 24, further including an inset member disposed within said flow passage, said insert member being configured to impart a rotational movement to the water flow from the pipe.

27. A method for counting an electrolytic cell in a swimming pool of the type having a water circulation line, including a pipe in flow communication with the pipe beneath the level of water therein, said method comprising the steps of:

positioning said electrolytic cell beneath the surface of the pool water and in front of an outlet of said pipe;

attaching said electrolytic cell in a position so that water flow from said pipe will flow across said cell;

providing an elongated electrical wire to connect said electrolytic cell to a power source remote from the water within said pool;

connecting one end of said wire to said electrolytic cell;

threading the wire through a portion of said pipe; and connecting an end of said wire to said power source to thereby supply electrical power to said electrolytic cell.

28. The method as defined in claim 27, wherein said attaching step includes positioning a first coupling member in said pipe adjacent said outlet end thereof, positioning a second coupling member in operative engagement with said electrolytic cell, and engaging said first and said second coupling members.

29. The method as defined in claim 28, wherein said threading step includes threading said wire through an opening in said first coupling member.

30. The method as defined in claim 27, wherein said wire is threaded through a portion of said pipe through the outlet end of said pipe and said opposite end of said wire is withdrawn from said pipe.

31. In a swimming pool of the type having a water circulation system including a pipe with an end inflow communication with the pool beneath the level of water therein, an apparatus for purifying the pool water comprising:

an electrolytic cell;

an enclosure housing said electrolytic cell, at least a portion of said enclosure being mounted beneath the level of water within said pool and overlaying the end of said pipe; and an electrical wire connected to said electrolytic cell and extended through said pipe to connect said electrolytic cell with a power source remote from said water within said pool.

* * * * *

UNITED STATES PATENT AND TRADEMARK OFFICE
CERTIFICATE OF CORRECTION

PATENT NO. : 5,389,210
DATED : February 14, 1995
INVENTOR(S) : Michael A. Silveri

It is certified that error appears in the above-indentified patent and that said Letters Patent is hereby corrected as shown below:

```
Column 7,  line 48, "emote" should be --remote--
Column 9,  line 16, "fist"  should be --first--
Column 10, line 5,  "inset" should be --insert--
Column 10, line 8,  "counting" should be --mounting--
```

Signed and Sealed this

Tenth Day of October, 1995

Attest:

BRUCE LEHMAN

Attesting Officer

Commissioner of Patents and Trademarks